US00RE40742E

(19) United States
(12) Reissued Patent
Koo

(10) Patent Number: US RE40,742 E
(45) Date of Reissued Patent: Jun. 16, 2009

(54) METHOD AND APPARATUS OF COMPOSING MENU FOR USERS

(75) Inventor: Eun Jeong Koo, Seoul (KR)

(73) Assignee: LG Electronics Inc., Seoul (KR)

(21) Appl. No.: 11/827,990

(22) Filed: Jul. 13, 2007

Related U.S. Patent Documents

Reissue of:
(64) Patent No.: 6,950,148
Issued: Sep. 27, 2005
Appl. No.: 10/005,425
Filed: Dec. 3, 2001

(30) Foreign Application Priority Data

Dec. 4, 2000 (KR) ..... 10-2000-0072910

(51) Int. Cl.
*H04N 5/50* (2006.01)
*H04N 5/445* (2006.01)

(52) U.S. Cl. ..... 348/569; 725/47

(58) Field of Classification Search ..... 348/569, 348/563, 564, 906, 734; 725/14, 46, 47; *H04N 5/50, H04N 5/445*

See application file for complete search history.

(56) References Cited

U.S. PATENT DOCUMENTS 5,867,226 A 2/1999 Wehmeyer et al.
5,999,228 A 12/1999 Matsuura et al.
6,169,543 B1 1/2001 Wehmeyer

*Primary Examiner*—Sherrie Hsia
(74) *Attorney, Agent, or Firm*—Lee, Hong, Degerman, Kang & Waimey

(57) ABSTRACT

The present invention relates to a method of composing a user menu by providing a shortened route to the menu the user selected among a hierarchically structured On Screen Display menu so that the user can find a menu he or she wants more conveniently. The method comprises the steps of deciding whether an item is optionally selected out of the hierarchically structured OSD menu items; deciding whether a user menu registration button for the optionally selected item is pressed; registering the selected menu with the user menu by adding an index to the currently selected item once the user menu registration button is properly pressed; displaying the registered user menu on an OSD menu if a user view menu is established; actuating a corresponding menu item when an optional item is selected among the user menu; and deleting a menu item from the user menu if a deletion button is pressed on an optionally selected item out of the user menu.

11 Claims, 4 Drawing Sheets

FIG.2A

| | |
|---|---|
| SETUP | Main Source |
| VIDEO | PIP Source |
| AUDIO | Channel Scan |
| SPECIAL | Channel Lable |
| TIME | Convergence |
| LOCK | |

FIG.2B

| | | |
|---|---|---|
| SETUP | Main Source | Ant/Cable |
| VIDEO | PIP Source | Video |
| AUDIO | Channel Scan | DVD |
| SPECIAL | Channel Lable | HD/STB |
| TIME | Convergence | PC Input |
| LOCK | | |

FIG.2C

| | | |
|---|---|---|
| SETUP | Caption | Normal |
| VIDEO | Languages | Wide |
| AUDIO | Aspect Ratio | Panorama |
| SPECIAL | Demo | Zoom |
| TIME | | |
| LOCK | | |

METHOD AND APPARATUS OF COMPOSING MENU FOR USERS

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a reissue application of U.S. Pat. No. 6,950,148 B2, the entirety of which is incorporated herein by reference. This application claims the benefits of priority under 35 U.S.C. § 119, 120 to Korean Application No. 10-2000-0072910, filed on Dec. 4, 2000, the entirety of which is incorporated herein by reference.*

BACKGROUND OF THE INVENTION

1. Field of the Invention

The present invention relates to a television system. In particular, the present invention relates to a method of composing a menu for users of digital televisions and an apparatus of composing a menu for users of digital televisions.

2. Description of the Related Art

In general, household digital appliances having a large display screen like a digital TV system use On Screen Display (OSD) in order to transmit information to users and help the users to designate functions they personally want.

All currently used digital appliances do have a variety of functions, and the users are able to change the designated functions anytime by using a remote control.

In such case, however, the structure or composition of the remote control is usually very complicated to be able to provide all kinds of functions. Therefore, most of the users prefer an OSD menu.

Fortunately, as a processor and memory capacity equipped in the household appliances have been continuously developed, it became possible to establish a menu using a graphic just as good as a personal computer in terms of the capacity thereof.

Accordingly, the OSD menu for designating a variety of functions especially in the digital appliances has been hierarchically structured and the depth of the hierarchy itself got deeper and complicated.

On the other hand, although digital appliances with various kinds of functions are available, and as hierarchically structured OSD menu has more complicated structures, the users had to go through a number of steps in order to confirm or change the establishment of the menu they want.

SUMMARY OF THE INVENTION

It is, therefore, an object of the present invention to provide a method of composing a menu for a user in order to help the user to easily find a more frequently used menu by providing a shortened step to the menu the user selected out of hierarchically structured OSD menu.

And an object of the present invention to provide an apparatus of composing a menu for a user in order to help the user to easily find a more frequently used menu by providing a shortened step to the menu the user selected out of hierarchically structured OSD menu.

In other words, the present invention provides an apparatus and method of composing a menu in which a user registers a certain menu item he or she frequently uses among the hierarchically structured OSD menu with a user menu, helping the user to find his or her favorite menu more conveniently.

To achieve the above object, there is provided a method of composing a menu which includes steps of: deciding whether an item is optionally selected out of the hierarchically structured OSD menu items; deciding whether a user menu registration button for the optionally selected item is pressed; registering the selected menu with the user menu by adding an index to the currently selected item once the user menu registration button is properly pressed; displaying the registered user menu on an OSD menu if a user view menu is established; actuating a corresponding menu item when an optional item is selected among the user menu; and deleting a menu item from the user menu if a deletion button is pressed on an optionally selected item out of the user menu. There is provided an apparatus of composing a user menu for displaying On Screen display (OSD) menu with a hierarchical structure, a graphics processing unit for graphically processing the OSD menu, a memory for storing index data on the OSD menu to provide the data to the graphics processing unit, a microcomputer for displaying the OSD menu or the user menu on the screen by controlling the said graphics processing unit.

BRIEF DESCRIPTION OF THE DRAWINGS

The above objects, features and advantages of the present invention will become more apparent from the following detailed description when taken in conjunction with the accompanying drawings, in which:

FIGS. 2A to 2C is an exemplary view of a state of On Screen Display menu in accordance with the present invention;

DETAILED DESCRIPTION OF THE PREFERRED EMBODIMENT

Figure 1:
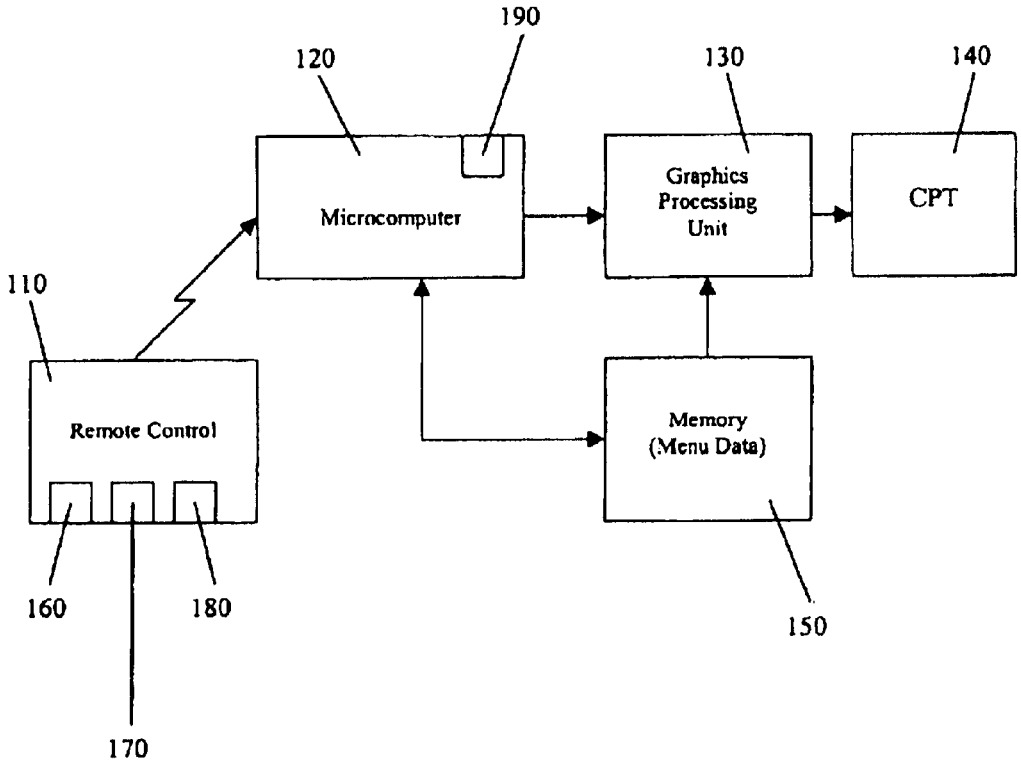
FIG. 1 is a block diagram of a device in accordance with a preferred embodiment of the present invention.

A preferred embodiment of the present invention will now be described with reference to the accompanying drawings. In the following description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a block diagram of an OSD menu composition device in accordance with a preferred embodiment of the present invention. As shown in FIG. 1, the OSD menu composition device includes: a graphics processing unit 130 for graphically processing the OSD menu or the user menu to display the menu on CPT 140 screen; a memory 150 for storing index data on the OSD menu and the user menu (for example, display position, caption size, color etc.) to provide the data to the graphics processing unit 130; a remote control 110 for the view and selection of the OSD menu, and registration, view and selection of the user menu; and a microcomputer 120 for displaying the OSD menu or the user menu on the CPT 140 screen by controlling the graphics processing unit 130 and by checking an output signal from the remote control 110 in case that the OSD menu or the user menu display button is pressed, and for registering an optionally selected menu item with the user menu by storing the index for the selected menu item into the user menu domain of the memory 150 in case that a user menu registration button 160 is pressed on an optional menu item selected among the currently displayed OSD menu.

The microcomputer 120 includes a remote control signal receiving circuit 190 as well as EEPROM or flash memory to store a control program for user menu registration.

The operation and effects of the embodiment according to the present invention are now explained with reference to the exemplary views shown in FIGS. 2 and 3, and an operation flow chart shown in FIG. 4.

For a better understanding, the preferred embodiment of the present invention is explained in three procedures: OSD menu display, registration of an item in the OSD menu to the user menu, and user menu display.

First of all, the OSD menu is displayed based on the following operation.

The user presses OSD menu button on the remote control 110, which is detected by the microcomputer 120. The microcomputer then controls the graphics processing unit 130 to display the OSD menu.

Accordingly, the graphics processing unit 130 reads index data of the OSD menu (such as, display position, caption size, color etc.) that have been stored in the memory 150 and carries out a designated graphics processing in order to display the initial OSD menu including items like 'SETUP', 'VIDEO', 'AUDIO', 'SPECIAL', 'TIME', or 'LOCK' on the CPT 140 screen.

At this time, if the user selects 'SETUP' item on the OSD menu by using a direction key equipped in the remote control 110, 'SETUP' item is activated and the hierarchically structured OSD menu like the exemplary view of FIG. 2(a) is displayed on the CPT 140 screen.

Referring to FIG. 2(a), if the user selects 'Main Source' using the remote control 110 while the 'SETUP' item is being activated, the 'Main Source' is also activated and the hierarchically structured OSD menu like the exemplary view of FIG. 2(b) is displayed on the CPT 140 screen.

On the other hand, if the user selects 'SPECIAL' item among the initial OSD menu by using the remote control 110, then 'Aspect Ratio' item, especially 'Panorama' item out of the detailed items of 'Aspect Ratio', the hierarchically structured OSD menu like the exemplary view of FIG. 2(c) is displayed on the CPT 140 screen.

If the user wants to activate 'Panorama' item in the state that the initial OSD menu is being displayed, what the user needs to do is to select 'SPECIAL', 'Aspect Ratio', and 'Panorama' sequentially by using the direction key on the remote control 110.

In addition, when the OSD menu is displayed as described above, the user can choose certain menu items he or she frequently uses, and registers them with the user menu. Then, using the user view menu buttons equipped in the remote control 110, the user can easily search for the menu he or she wants. More details are followed below.

To begin with, in order to register a specific menu item with the 'user menu', the user presses the 'user menu registration' button on the remote control 110 at the state that an optional item out of the OSD menu is being activated. The microcomputer 120 then detects what the user pressed, and stores index data on the corresponding item into the user menu domain of the memory 150 for registering it with the 'user menu' item.

Similar to what is illustrated in FIG. 2(b), if the user presses the 'user menu registration' button equipped in the remote control 110 while the 'Main Source' item is being activated at the same time, the 'Main Source' item is registered, and as shown in FIG. 2(c), 'Panorama' item is registered if the 'Panorama' item is being activated.

Also, to see the user view menu, the user just needs to pressure the user view menu button on the remote control 110. The graphics processing unit 130 that is controlled by the microcomputer 120 reads the index data in the user menu domain from the memory 150.

Later, the graphics processing unit 130 processes the index data that have been read from the memory 150 following the designated manner, and displays 'user menu' on the CPT 140 screen.

Figure 3A:
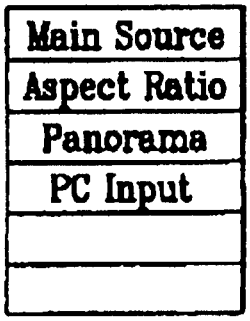
FIGS. 3A to 3C is an exemplary view of a state of a user menu display in accordance with the present invention.
Figure 4:
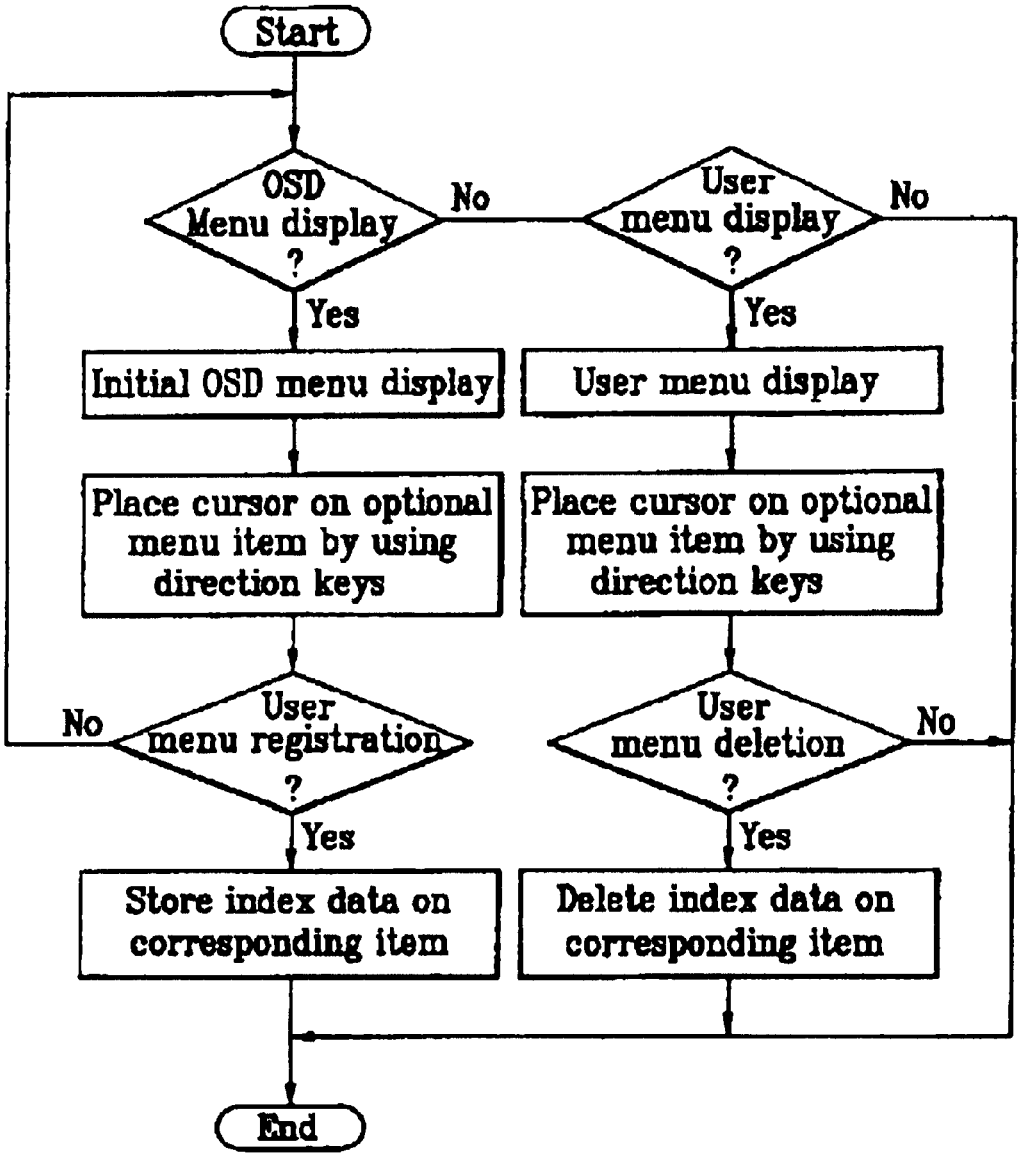
FIG. 4 is an operation flow chart.

As an illustration, the 'user menu' displayed on the CPT 140 screen can be shown similar to the exemplary view of FIG. 3(a).

Figure 3B:
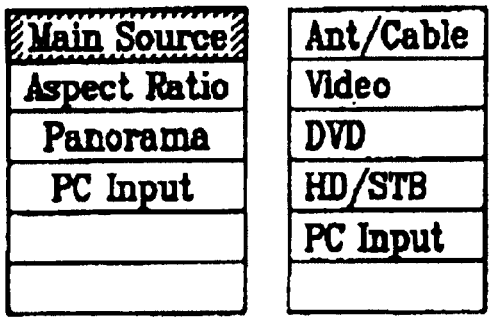
Figure 3C:
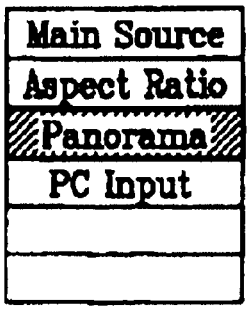

Therefore, if the user wishes to see detailed items of 'Main Source', he or she can move the cursor of the remote control 110 to 'Main Source', as shown in FIG. 3(b), and press a confirm key 170. Then, the microcomputer 120 detects this, and controls the system to actuate the corresponding operation based on the decision regarding the designated 'Panorama' function, as shown in FIG. 3(c).

Although the procedures of the user menu registration and view only have been explained above, the user also can delete any item from the user menu at any time.

In other words, when the user menu is being displayed, the user can move the cursor to the menu item he or she wants to delete, and press the user menu deletion button 180 on the remote control 110. The microcomputer 120 again detects this, and deletes the index data on the corresponding menu stored in the memory 150, deleting the user menu item.

In the meantime, once the user menu is registered as above, the user menu is displayed in a pre-designated format, which can be optionally composed of display position of the user menu screen, size and color.

Accordingly, the present invention provides the user with a more convenient way to find a menu item he or she wants, in which the user can register the frequently used menu items and press the key once to display the CPT screen so that the user can find the menu he or she wants out of the hierarchically structured OSD menu more easily.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of composing a user menu for displaying On Screen Display (OSD) menu with a hierarchical structure, the method comprising the steps of:

deciding whether an item is optionally selected out of the hierarchically structured OSD menu items;

deciding whether a user menu registration button for the optionally selected item is pressed;

registering the selected menu *item* with the user menu by adding an index to the currently selected item once the user menu registration button is properly pressed;

displaying the registered user menu on an OSD menu if a user view menu is established; actuating a corresponding menu item when an optional item is selected among the user menu; and deleting a menu item from the user menu if a deletion button is pressed on an optionally selected item out of the user menu.

2. A method of composing a user menu for displaying On Screen Display (OSD) menu with a hierarchical structure of claim 1, wherein said user menu is setting if the user select 'main source' using the remote control.

3. A method of composing a user menu for displaying On Screen Display (OSD) menu with a hierarchical structure of claim 1, wherein the user select 'special' item among the initial OSD menu using the remote control, then the hierarchically structured OSD menu is displayed.

4. A method of composing a user menu for displaying On Screen Display (OSD) menu with a hierarchical structure of claim 1, wherein when the user menu displayed the user can choose certain item.

5. A method of composing a user menu for displaying On Screen Display (OSD) menu with a hierarchical structure of claim 1, wherein said registering step registers a specific user menu; the user presses the 'user menu registration' button on the remote control, a microcomputer detects the user pressed button, and stores index data on the corresponding item into the user menu domain.

6. A method of composing a user menu for displaying On Screen Display (OSD) menu with a hierarchical structure of claim 1, wherein a user can delete any item from the user menu at any time by deletion button on the remote control.

7. A method of composing a user menu for displaying On Screen Display (OSD) menu with a hierarchical structure of claim 1, wherein a user can be optionally composed of display position of the user menu screen, size and color.

8. A method of composing a user menu for displaying On Screen Display (OSD) menu with a hierarchical structure of claim 1, wherein if the user wishes to see detailed items of 'main source', the user moves the cursor of the remote control and presses a confirm key.

9. An apparatus of composing a user menu for displaying On Screen Display (OSD) menu with a hierarchical structure, the apparatus comprising:

a graphics processing unit for graphically processing the OSD menu;

a memory for storing index data on the OSD menu to provide the data to the graphics processing unit;

a microcomputer for displaying the OSD menu or the user menu on the screen by controlling said graphics processing unit and for actuating a corresponding menu item when an optional item is selected among the user menu; and a remote control having a deletion button for deletion a menu item from the user menu.

10. An apparatus of composing a user menu for displaying On Screen Display (OSD) menu with a hierarchical structure of claim 9, wherein said graphics processing unit displays the user menu on the screen.

11. An apparatus of composing a user menu for displaying On Screen Display (OSD) menu with a hierarchical structure of claim 9, wherein said microcomputer includes a remote control signal receiving circuit.

* * * * *